US007583845B2

(12) United States Patent (10) Patent No.: US 7,583,845 B2
Lee et al. (45) Date of Patent: Sep. 1, 2009

(54) ASSOCIATIVE VECTOR STORAGE SYSTEM SUPPORTING FAST SIMILARITY SEARCH BASED ON SELF-SIMILARITY FEATURE EXTRACTIONS ACROSS MULTIPLE TRANSFORMED DOMAINS

(75) Inventors: Kuo Chu Lee, Princeton Junction, NJ (US); Hasan Timucin Ozdemir, Plainsboro, NJ (US)

(73) Assignee: Panasonic Corporation, Osaka (JP)

( * ) Notice: Subject to any disclaimer, the term of this patent is extended or adjusted under 35 U.S.C. 154(b) by 760 days.

(21) Appl. No.: 11/354,761

(22) Filed: Feb. 15, 2006

(65) Prior Publication Data

US 2007/0189601 A1 Aug. 16, 2007

(51) Int. Cl.
*G06K 9/36* (2006.01)
(52) U.S. Cl. .................................................. 382/232
(58) Field of Classification Search ................. 382/190, 382/232, 235, 236, 240, 305; 707/3–7, 10, 707/100, 102, 104.1
See application file for complete search history.

(56) References Cited

U.S. PATENT DOCUMENTS

| 5,774,593 A * | 6/1998 | Zick et al. ................... 382/236 |
| 6,192,151 B1 * | 2/2001 | Miyatake et al. ............ 382/190 |
| 6,438,165 B2 * | 8/2002 | Normile ....................... 375/240 |
| 7,529,741 B2 * | 5/2009 | Aravamudan et al. .......... 707/3 |

* cited by examiner

*Primary Examiner*—Jose L Couso
(74) *Attorney, Agent, or Firm*—Harness, Dickey & Pierce, PLC

(57) ABSTRACT

An associative vector storage system has an encoding engine that takes input vectors, and generates transformed coefficients for a tunable number of iterations. Each iteration performs a complete transformation to obtain coefficients, thus performing a process of iterative transformations. The encoding engine selects a subset of coefficients from the coefficients generated by the process of iterative transformations to form an approximation vector with reduced dimension. A data store stores the approximation vectors with a corresponding set of meta data containing information about how the approximation vectors are generated. The meta data includes one or more of the number of iterations, a projection map, quantization, and statistical information associated with each approximation vector. A search engine uses a comparator module to perform similarity search between the approximation vectors and a query vector in a transformed domain. The search engine uses the meta data in a distance calculation of the similarity search.

36 Claims, 2 Drawing Sheets

Cross multiple transformed domain Coefficient Encoding Module

ASSOCIATIVE VECTOR STORAGE SYSTEM SUPPORTING FAST SIMILARITY SEARCH BASED ON SELF-SIMILARITY FEATURE EXTRACTIONS ACROSS MULTIPLE TRANSFORMED DOMAINS

FIELD

The present disclosure generally relates to an associative vector storage system, and relates in particular to fast similarity search based on self-similarity feature extractions across multiple transformed domains.

BACKGROUND

The statements in this section merely provide background information related to the present disclosure and may not constitute prior art.

It is well known to the experts in the field that it is hard to obtain a sub-linear similarity search-operation over a large vector data set. Research results have been obtained on limited data sets such as time series data and face image data, etc. These results mainly focused on variations of statistical clustering analysis, such as: (a) "static" supporting vector analysis that divides the data set into a smaller number of clusters to facilitate the search operation; (b) "dynamic" tree structures to support a hierarchical search; and (c) perform cosine or wavelet transformation to select dominant coefficients that can be used to approximate the original data.

SUMMARY

An associative vector storage system has an encoding engine that takes input vectors, and generates transformed coefficients for a tunable number of iterations. Each iteration performs a complete transformation to obtain coefficients, thus performing a process of iterative transformations. The encoding engine selects a subset of coefficients from the coefficients generated by the process of iterative transformations to form an approximation vector with reduced dimension. A data store stores the approximation vectors with a corresponding set of meta data containing information about how the approximation vectors are generated. The meta data includes one or more of the number of iterations, a projection map, quantization, and statistical information associated with each approximation vector. A search engine uses a comparator module to perform similarity search between the approximation vectors and a query vector in a transformed domain. The search engine uses the meta data in a distance calculation of the similarity search.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

An associative vector storage system exploits a property of self-similarity across multiple transformed domains to achieve fast retrieval and better accuracy for associative queries. The types of associative queries can include finding the best matching set of sample vectors given a set of query vectors using multiple types of distance measurement functions. The system can employ pre-processing of input vectors to achieve faster and more accurate search.

Figure 1:
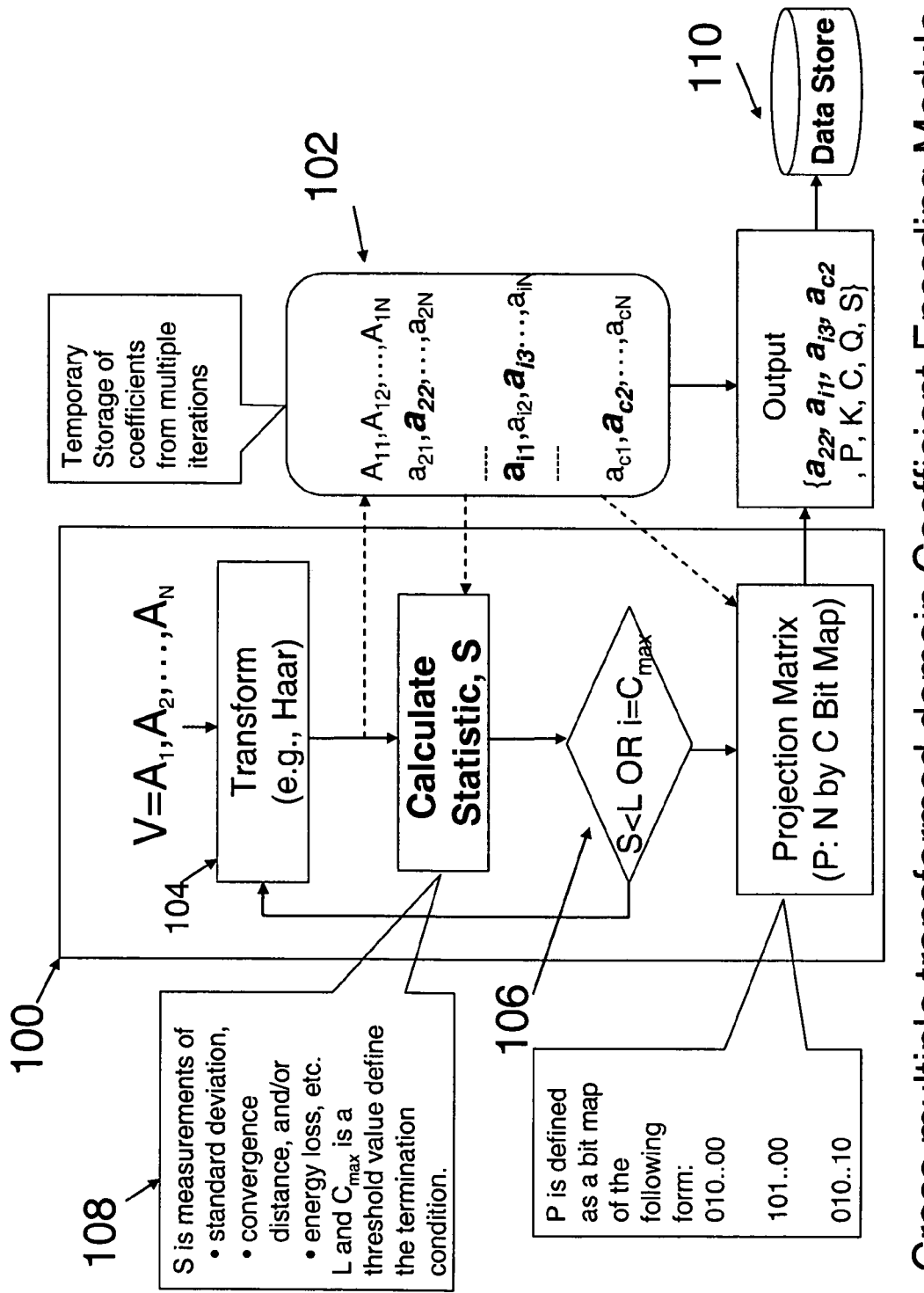
FIG. 1 is a block diagram illustrating components of a real-time encoding module for use with a search engine of an associative vector storage system.

Unlike prior work, which focuses on data mining based on "one single" transformed domain, this system exploits data mining on a collection of multiple transformed domain. An associative search engine of the system can be structured to control the generation and access to the coefficients from multiple transformations. With reference to FIG. 1, the search engine contains an encoding module 100 that takes an N dimensional input vector V, generates transformed coefficients 102 via transform module 104 (in this case, Haar transform) for a tunable number of iterations, C. For C iterations of transformation, a set of approximation vectors form a transformation matrix, $A_{ij}$, where $0<i<C+1$ and $0<j<N+1$. The coefficients from the transformation matrix are then projected using a projection map, P to form an approximation vector of dimension K. P is a bit map matrix with C row, N column. The total number of bit set "1" in the P is K and the remaining bits are set to "0". The resulting approximation vector is represented as, $a_i$, where $0<i<K+1$. Each coefficient in the approximation vector, $a_i$, is, then quantized to a factor of Q less number of bits compared to the original coefficient. The maximal number of iteration, $C_{max}$ is controlled by a training module which collects statistical information of the approximation vector. The statistical information includes standard deviation, accuracy of distance calculation, and root-mean-square of each coefficient from a selected subset of input vectors.

The approximation vector, $a_i$, is stored with an index to meta information associated with how the approximation vector is generated. The meta information including i) Projection matrix, P, ii) iterative control parameter, C, and reduced dimension, K, iii) quantization level Q, and iv) statistical property of the approximation vector, S.

The meta information and all the approximation vectors are maintained in the data storage module 110 which can be accessed by the search engine.

The meta information is used by an encoding module to create the approximation query vector of the same format of an approximation vector stored in the associative storage system. One unique feature of the proposed system is that it uses both the approximation vector and the meta information, $\{a_i, P, C, K, Q, S\}$ to calculate the distance between the approximation query vector and the approximation data vector stored in the associative storage system.

Each iteration performs a complete transformation and records the coefficients 102. After C iterations, there will be N times C coefficients. The standard deviations 108 are monitored for each iteration and can be used at 106 to decide whether additional iteration can provide convergence of the standard deviation to a threshold value L (L<1), thereby obtaining multiple transformation vector $\{H_C(V)\}$.

This concept has been validated by generation of a test data set using $\{a[1:32], C=8, K=32, L=0.25]\}$ for similarity search. The projection vector for larger C tends to result in a better data distribution for similarity search for a non-uniformly distributed data set. Providing more information about the vector using independently extracted parameters can further increase the probability of match accuracy. Thus, the search engine can have a structure that supports the creation of different types of indexes based on different meta information obtained from the process of iterative transformations.

In some embodiments, the vector engine can support various types of indexing. For example, it can create an index based on the tuple (Quantization(Projection(Haar$_C$(V))); K is the dimension of the vector set V. C is the iteration of transformation to achieve standard deviation value L. Quantization and projection create an approximation vector. A default value of C can be equal to log(K) if L is not specified. The calculation of standard deviation can use the whole vector or the segment of a vector, and the iteration can be stopped if there is no change in the standard deviation.

In additional or alternative embodiments, the engine can create an index based on "Convergence Distance" CD=Distance(Projection(Haar$_M$(V))−Projection(Haar$_C$(V)). The selection of M is based on convergence of Haar$_M$(V) and Haar$_{(M+1)}$(V)<smallest similarity bound. M can be a value much larger than log(dimension(V)). The iteration can be stopped if there is no change in the distance.

In additional or alternative embodiments, the engine can create an index based on "Minimal Energy Loss." The truncation of dimensions introduces an energy loss. The selection of M can be based on the minimal energy loss of Projection (Haar$_1$(V)), . . . , Projection(Haar$_M$(V)), Projection (Haar$_{(M+1)}$(V)).

All the above types of indices are based on coefficients from multiple iterations to result in an approximation of the original vector with much less number of bits. The structure of the search engine design can support the combination of all these indexing schemes flexibly.

Figure 2:
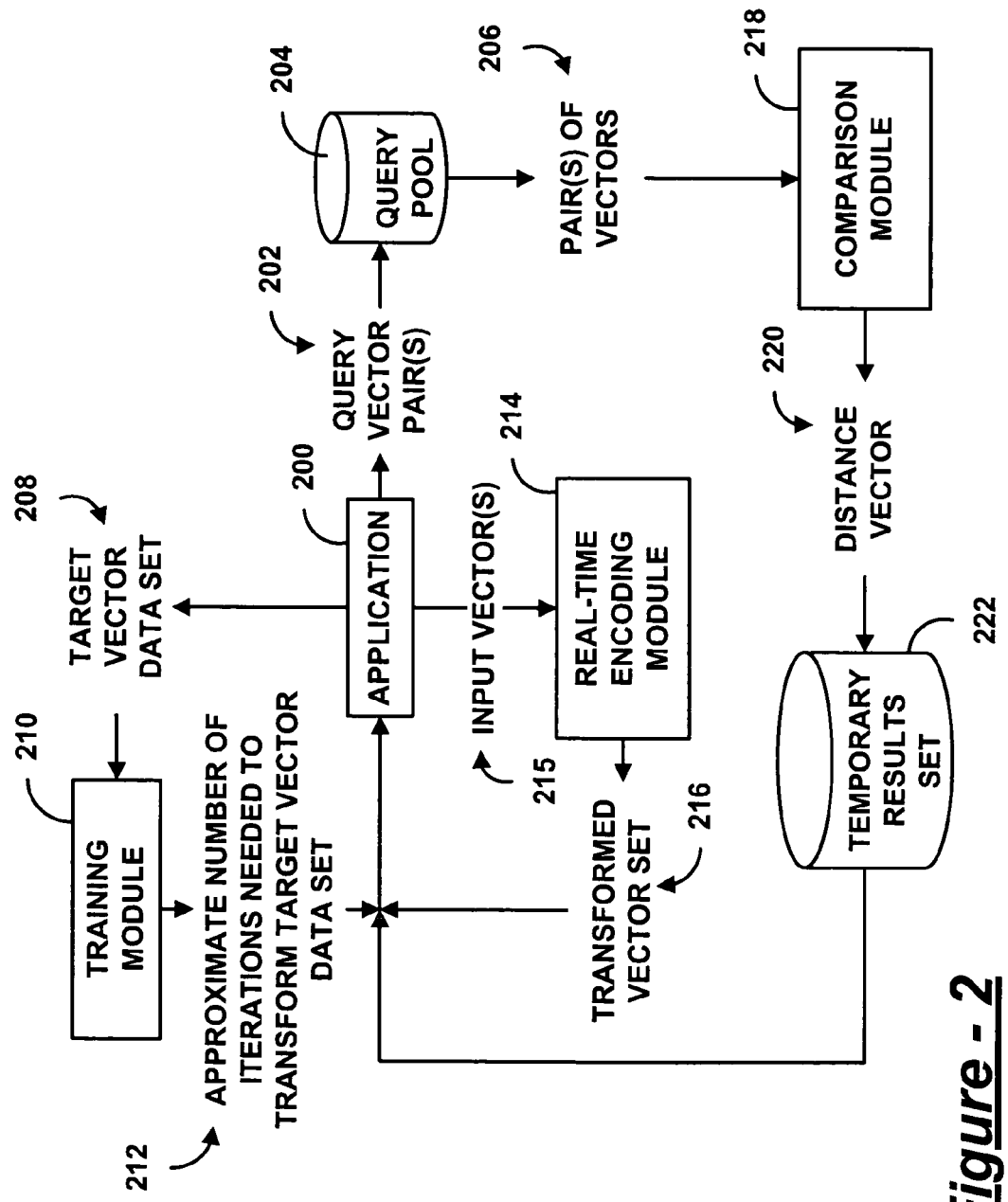
FIG. 2 is a block diagram illustrating components of a search engine of an associative vector storage system.

Turning now to FIG. 2, the search engine can include various components. For example, the search engine can include a training module 210 that performs global analysis of an iterative convergence property of a target vector data set 208. This module 210 can analyze the vector data in the set 208 and produce an approximation 212 of the meta information such as number of iterations and projection map, etc., needed to transform the vector data set 208. Various types of indicators can be used. For example, one can use standard deviation of the vector elements (the whole vector or segment of a vector) to observe the convergence. One can also calculate if there is a convergence "fixed point" for a set of sample vectors (referred to as training set).

The search engine can alternatively or additionally include a real-time encoding module 214 that takes each input vector 215 and performs transformation iteratively until a preset criterion is met. The output of the module is a transformed vector set 216 each having a (approximation vector and meta data) pair. The meta data can contain information such as the number of iterations, the projection map, and quantization level of the vector. The criterion can be based on standard deviation of the vector itself at the i-th iteration or the distance to the fixed points of a training vector set after k-th iteration.

Additionally or alternatively, the search engine can include a comparison module 218. This module takes a pair of two input vectors 206, which can be of the format produced by encoding module 214. It can make use of the meta data to generate a distance vector 220 by comparing the approximation query vector and approximation data vectors 206 in their corresponding transformed domain. Since the vectors may not be in the same format, this module 218 can use the encoder to perform the transformation, projection, and quantization to produce the distance between the two vectors in different transformation, projection, and quantization format. In a typical simplified case, this module 218 can simply compare two vectors of the same format and produce a distance measure.

Alternatively or additionally, the search engine can include a query pool that contains a set of query vectors 204. This pool can allow an application 200 to insert and maintain a set of active queries that can be used to search an input vector set. Processing multiple query concurrently against the input approximation vector can reduce the number of Input/Output operations.

Alternatively or additionally, the search engine can include a temporary result set 222. The result set 222 can contain candidate results that are most qualified based on the distance measure 220 generated by the comparison module 218.

The search technique expands the analysis of a vector data set from one domain to multiple domains through iterative transformation. By observing the property of transformed vectors at different domains, it is possible to select a most efficient representation at the i-th iteration for projection, quantization, and other types of data compression with smaller impact on the statistical accuracy. Specific advantages for different class of applications include:

Uniform quantization: Since after multiple transformations, some vector data set with data skew may become more uniformly distributed, the data set preserves more accuracy after uniform quantization. If ortho-normal transformation is used, L2 distance based similarity measure after multiple iterative transformations are preserved. Then, the uniform quantization can also result in less error in the similarity search operation.

Projection: After i-th iteration, the data set that originally skewed in a few dominant coefficients is likely to be mixed with other coefficients and generate coefficients that are correlated between the dominant and non-dominant coefficients. As a result, it is possible to pick an arbitrary data set instead of doing analysis of which coefficient is dominant and achieve similar accuracy.

Indexing: Multiple iterations provide a new property that is independent from the original vector sets. Coefficients collected from different iterations can be used to construct one or more indexes across multiple transformed domains. This cross transform domain indexing provides additional information to the intra-domain multi-resolution indexing.

What is claimed is:

1. An associative vector storage system, comprising:
an encoding engine that takes input vectors, and generates transformed coefficients for a tunable number of iterations, wherein each iteration performs a complete transformation to obtain coefficients, thereby performing a process of iterative transformations, wherein said encoding engine selects a subset of coefficients from the coefficients generated by the process of iterative transformations to form an approximation vector with reduced dimension;
a data store that stores the approximation vectors with a corresponding set of meta data containing information about how the approximation vectors are generated, wherein the meta data includes at least one of the number of iterations, a projection map, quantization, or statistical information associated with each approximation vector; and
a search engine that uses a comparator module to perform similarity search between the approximation vectors and a query vector in a transformed domain, wherein said search engine uses the meta data in a distance calculation of the similarity search.

2. The system of claim 1, wherein said search engine employs Harr transform in the process of transformations.

3. The system of claim 1, wherein said search engine monitors standard deviations for each iteration in order to decide whether additional iteration can provide convergence of the standard deviation of the approximation vector to a threshold value.

4. The system of claim 1, wherein said search engine has a structure that supports creation of different types of approximation vectors based on a meta data property derived from the process of transformations.

5. The system of claim 4, wherein an iteration control parameter and an associated standard deviation are stored with approximation vectors and a query vector as additional information for data mining.

6. The system of claim 4, wherein said encoding module creates an approximation vectors and meta data based on a tuple, {[aij, P, Q, K, C, S], where P is a projection bit map matrix, C is an iterative control parameter, K is reduced dimension, Q is quantization bits, and S is a statistical property of the approximation vector.

7. The system of claim 6, wherein S is at least one of standard deviation or a root-mean-square value of the approximation vector.

8. The system of claim 6, wherein said search engine performs quantization and projection to create an approximation vector.

9. The system of claim 6, wherein a default value of C is equal to log(K) if L is not specified.

10. The system of claim 6, wherein calculation of standard deviation employs a whole vector and the iteration is stopped if there is no change in the standard deviation.

11. The system of claim 6, wherein calculation of standard deviation employs a segment of a vector based on the projection bit map matrix and the iteration is stopped if there is no significant change in the standard deviation.

12. The system of claim 4, wherein said encoding module creates an index based on a convergence distance, CD, wherein CD=Distance(Projection($Harr_M(V)$)−Projection($Harr_{(M+1)}(V)$)) is less than a smallest similarity bound.

13. The system of claim 12, wherein the iteration is stopped if there is no significant change in the distance.

14. The system of claim 4, wherein truncation of dimensions introduces an energy loss, and said search engine creates an index based on minimal energy loss.

15. The system of claim 14, wherein, for a vector set, V, selection of M is based on the minimal energy loss of projection($Haar_1(V)$), . . . , projection($Haar_M(V)$), projection($Haar_{(M+1)}(V)$).

16. The system of claim 4, wherein said search engine creates an index based on projection of each sample vector to its own meta data, C, K, S, wherein K reflects dimension of the approximation vector set, $V_{approximation}$, and C is the iteration control parameter reflecting an iteration of transformation to achieve a standard deviation value defined by S.

17. The system of claim 4, wherein structure of said associative storage system supports combination of multiple indexing schemes using different types of approximation vectors created by different coefficient selection criteria flexibly, wherein the coefficient selection criteria relates to at least one of energy, standard deviation, or convergence distance.

18. The system of claim 1, wherein said search engine includes a training module performing global statistical analysis of a statistical property, S, controlling an iterative convergence property of transformation process for a target vector data set.

19. The system of claim 18, wherein the training module analyzes vector data and produces an approximation of a number of iterations needed to transform the vector data set in order to achieve a target convergence in accordance with a predefined indicator.

20. The system of claim 18, wherein the indicator is standard deviation of vector elements to observe the convergence.

21. The system of claim 18, wherein the indicator is a calculated convergence fixed point for a set of sample vectors.

22. The system of claim 1, wherein said search engine includes a real-time encoding module that takes an input vector and performs transformation iteratively until a preset criterion is met.

23. The system of claim 22, wherein an output of the real-time encoding module is a transformed vector set including a transformed vector and vector-descriptor.

24. The system of claim 23, wherein the vector descriptor contains information including a number of iterations.

25. The system of claim 23, wherein the vector descriptor contains information including a projection of a vector.

26. The system of claim 23, wherein the vector descriptor contains information including a quantization level of the vector.

27. The system of claim 22, wherein the criterion is based on standard deviation of the input vector following an iteration.

28. The system of claim 22, wherein the criterion is based on a distance to fixed points of a training vector set following an iteration.

29. The system of claim 1, wherein said search engine includes a comparison module that takes a pair of two input vectors, performs transformation, and generates a distance vector by comparing the two input vectors in their corresponding transformed domain.

30. The system of claim 29, wherein said comparison module performs transformation, projection, and quantization to produce a max and min vector pair that describes a distance between the two input vectors in a different transformation, projection, and quantization format.

31. The system of claim 1, wherein said search engine includes a query pool that contains a set of query vectors.

32. The system of claim 31, wherein the query vector pool is configured to allow an application to insert and maintain a set of active queries used by said search engine to search an input vector set.

33. The system of claim 1, wherein said search engine includes a temporary result set that contains candidate results that are most qualified based on a distance measure generated by a comparison module.

34. The system of claim 1, wherein said encoding engine performs multiple iterative transformations to achieve a more uniform distribution of properties from the original high dimensional vector to its corresponding lower dimension approximation vector so that average quantization error can be reduced.

35. The system of claim 1, wherein said search engine is configured to operate in such a manner that, after an i-th iteration, a data set that originally skewed in a few dominant coefficients is likely to be mixed with other coefficients and generate coefficients that are correlated between dominant and non-dominant coefficients.

36. The system of claim 1, wherein said search engine is operable to collect coefficients from different iterations and use them to construct an index across multiple transformed domains, providing additional information to intra-domain multi-resolution indexing.

* * * * *